United States Patent
Olsén

[11] Patent Number: 5,241,481
[45] Date of Patent: Aug. 31, 1993

[54] METHOD AND A DEVICE FOR LASER OPTICAL NAVIGATION

[75] Inventor: Bengt O. Olsén, Högen, Sweden

[73] Assignee: Arnex Handelsbolag, Goteborg, Sweden

[21] Appl. No.: 570,960

[22] Filed: Aug. 21, 1990

Related U.S. Application Data

[63] Continuation of Ser. No. 206,186, Jun. 13, 1988, abandoned.

[30] Foreign Application Priority Data

Jun. 22, 1987 [SE] Sweden .............................. 8702569

[51] Int. Cl.⁵ .............................................. G06F 15/50
[52] U.S. Cl. ............................... 364/449; 364/424.02
[58] Field of Search ................ 364/424.01, 424.02, 364/449, 456, 460, 513, 443, 444

[56] References Cited

U.S. PATENT DOCUMENTS

| | | | |
|---|---|---|---|
| 4,225,226 | 9/1980 | Davidson et al. | 364/456 |
| 4,482,960 | 11/1984 | Pryor | 364/456 |
| 4,488,233 | 12/1984 | Tsumura | 364/456 |
| 4,685,806 | 8/1987 | Arnberg | 356/400 |
| 4,700,301 | 10/1987 | Dyke | 364/456 |
| 4,796,198 | 1/1989 | Boultinghouse et al. | 364/513 |
| 4,815,008 | 3/1989 | Kadonoff et al. | 364/449 |
| 4,817,000 | 3/1989 | Eberhardt | 364/443 |
| 4,829,442 | 5/1989 | Kadonoff et al. | 364/449 |
| 5,068,795 | 11/1991 | Kamimura et al. | 364/424.02 |

FOREIGN PATENT DOCUMENTS 0185816 12/1984 European Pat. Off. ........ 364/424.02

Primary Examiner—Thomas G. Black
Assistant Examiner—Michael Zanelli
Attorney, Agent, or Firm—Harness, Dickey & Pierce

[57] ABSTRACT

A laser-optical navigation method and apparatus are provided for rotationally emitting a pulsed beam of light from a transmitter/sensor unit mounted on a vehicle. Ground mounted reflectors in the path of the emitted light reflect the light back to the transmitter/sensor unit, which converts the reflected light to electrical signals. Attitude angles and other directional and locational information are computed from these signals, which may be used to navigate the vehicle.

20 Claims, 3 Drawing Sheets

METHOD AND A DEVICE FOR LASER OPTICAL NAVIGATION

This is a continuation of U.S. patent application Ser. No. 206,186, filed Jun. 13, 1988, now abandoned.

BACKGROUND OF THE INVENTION

The subject invention concerns a method for laser-optical navigation and a device for performing the method.

Within farming and forestry there is a need for devices which would make the use of utility vehicles and implements easier by providing automatic and accurate control and guidance of the position of the vehicles and implements during driving and operation thereof. If such position control and guidance were obtained, the operator of the farming or forestry equipment could devote his attention more fully to other aspects of the work, such as regulating and control of the operation of the utility implements and the results of the work, whether it be manure-spreading, sowing or harvesting. In addition, it is usually very tiring for the vehicle operator to drive for instance a tractor on a field for any length of time with absolute accuracy along a line which should be as straight as possible despite the uneven ground, such as is required for instance for manure-spreading and fertilizer-spreading, sowing or harvesting operations.

A number of different navigation systems have been developed, all having for their purpose to continuously determine the position of a moving object, such as a vehicle. Several of these systems operate on radio position finding technology and they are best suited for navigation operations that are intended to cover large open areas or when the distances between the transmitter and the receiver units are large or comparatively large. For this reason they are used mainly onboard ships at sea or in aeroplanes. Various types of radio finding systems, for instance satellite based systems, are useful on offshore installations to determine the position of oil rigs and accommodation platforms. However, for navigation purposes within limited areas, such as a field having a surface area of about a few acres, such systems are not particularly useful, for the reason that because of the "crowdedness of the ether medium" it is not possible (or allowed) to utilize the broad wavebands as would be desirable if one wants to achieve the high position-determination precision aimed at, i.e. within a fraction of a meter. Radio navigation on the basis of a narrow waveband, on the other hand, requires complicated, and therefore expensive, transmitter and receiver equipment. Also other factors, such as reflection errors and interference, restrict the usefulness of radio navigation systems for position determination purposes which must meet the accuracy requirements set forth above. These systems therefore are used primarily within ranges of a few hundred kilometers and the most sophisticated systems of this kind may achieve an accuracy of about a meter across water and about ten meters across land.

Navigation systems operating on microwave technology also exist. Experimentally, microwave technology has been used for navigation purposes also within more limited areas, such as is the case within agriculture and forestry. However, this technology requires comparatively expensive and complex equipment and thus for that reason alone its use is limited.

Neither radio nor microwave navigation systems provide accurate attitude determination, which is a prerequisite if exact control and guidance of soil working implements and control of unmanned vehicles are to be achieved.

The purpose of the invention is to provide practical and reliable navigation equipment in which laser-optical systems are used. Prior-art laser-optical systems have hitherto been used only indoors for vehicles which move across level ground within a very limited area. Consequently, such prior-art systems cannot in any respect meet the demands that necessarily must be made on equipment intended to be used on a vehicle which is driven on uneven surfaces, such as a field, for instance.

SUMMARY OF THE INVENTION

The invention provides a laser-optical navigation method and device which may easily be handled by a single person and which could easily be adapted to the local terrain conditions.

The laser-optical navigation method in accordance with the invention is characterized therein that a rotating pulsed beam of light in the shape of a vertical fan is transmitted from a transmitting sensor unit and that light of said beam of light which is reflected by reflectors is registered by the transmitter/sensor unit and is computer processed for determination of the position of the transmitter/sensor unit in the longitudinal, lateral and elevational directions and of the attitude angles.

The device for performing the laser-optical navigation method, which device comprises a transmitter/sensor unit for transmission and reception of light pulses, and reflectors disposed a distance away for reflecting these light pulses is characterized therein that the transmitter/sensor unit comprises means designed to emit a rotationally pulsed beam of light in the shape of a vertical fan and in that the device further comprises means to measure the elevation angle position of the device and an angle transducer to determine the lateral angle position of the device and also a first computer for image analysis and a second computer for executing the required navigation calculations on the basis of information received from the first computer.

BRIEF DESCRIPTION OF THE DRAWINGS

The invention will be described in closer detail in the following with reference to the accompanying drawings. wherein.

DETAILED DESCRIPTION OF A PREFERRED EMBODIMENT

Figure 1:
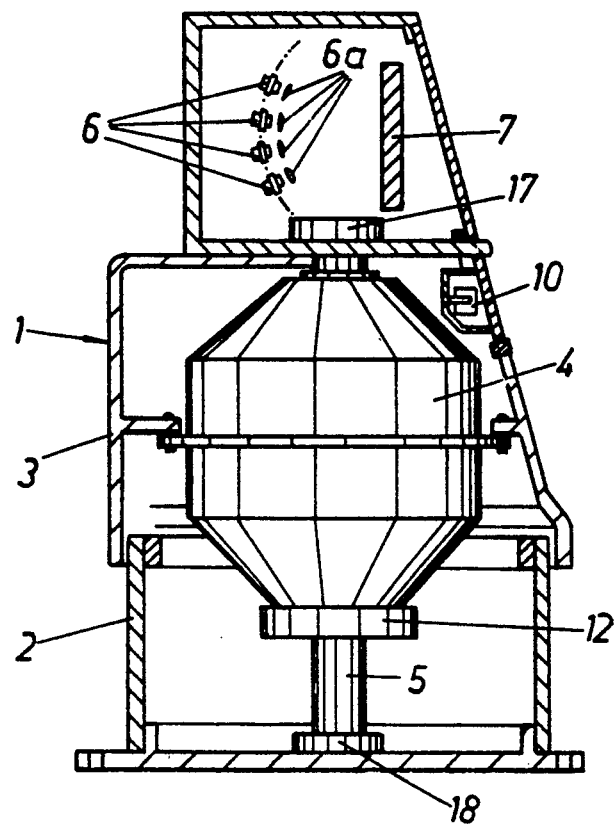
FIG. 1 is a vertical sectional view through the device in accordance with the invention.
Figure 2:
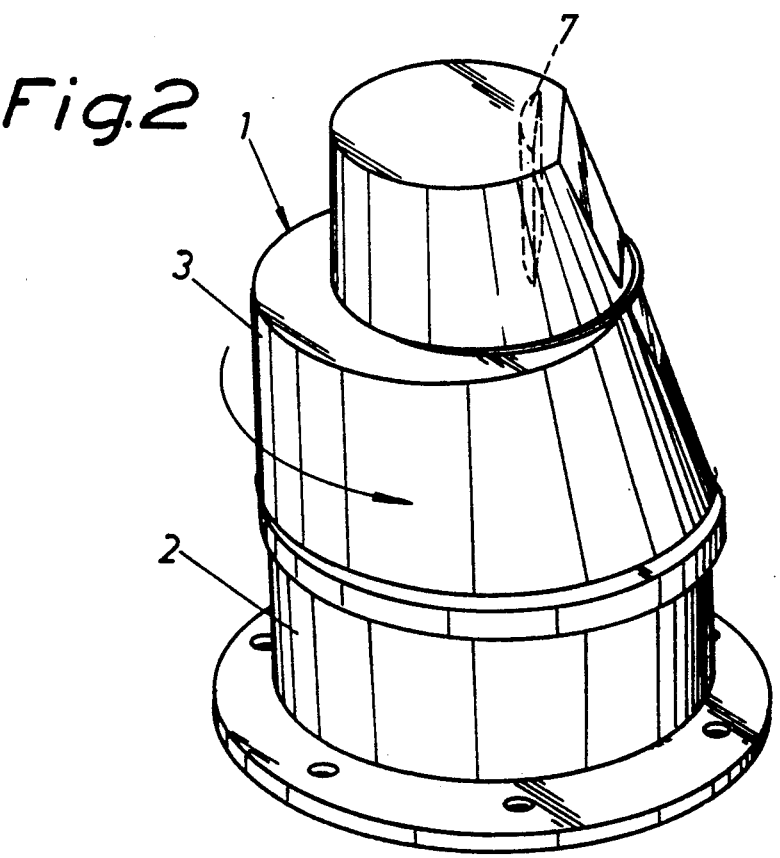
FIG. 2 is a perspective view of the device.

The device is enclosed in a housing 1 comprising one stationary section 2 and one rotating section 3. The rotating section 3 is connected with and it is rotated by the rotor 4 of an external rotor motor having a fixed stator 5.

Figure 3:
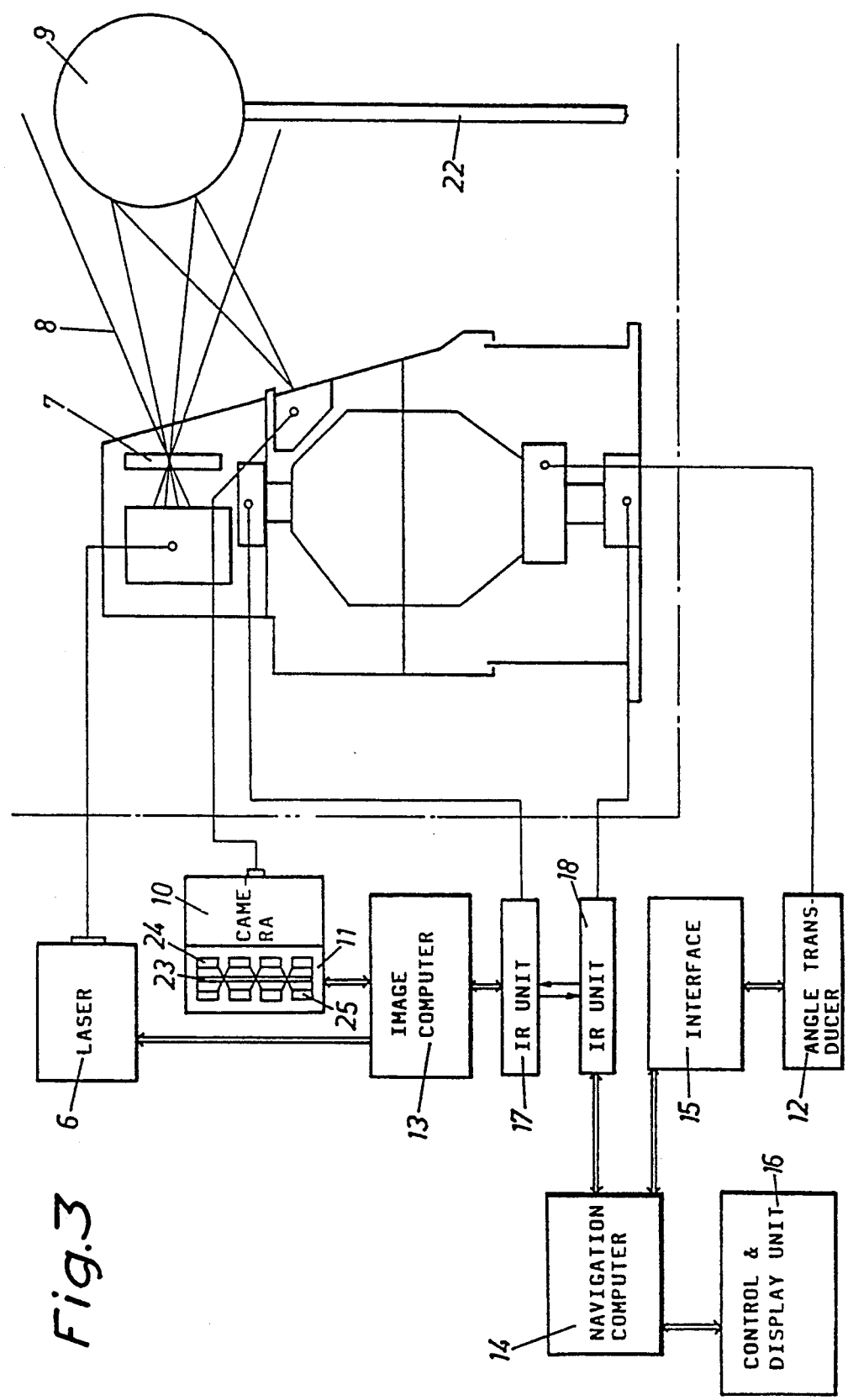
FIG. 3 is a schematic view of the structure of the electronic means of the device.

In the rotating section 3 of the housing 1 is contained a transmitter/sensor unit which is part of the device. The transmitter/sensor comprises a set of laser diodes 6 which together with one beam focusing lens 6a are mounted in superposed positions along a curved line behind a laterally collimating lens 7 which is common to all the laser diodes. The function of the set of laser diodes 6 is to emit a pulsed beam of light 8 while rotating (see FIG. 3) which beam impinges on reflectors 9 which are set out at suitable locations and which reflect the light to a co-rotating camera 10 which is part of the transmitter/sensor unit. The light pulses transmitted to the camera are received by a linear photo diode array 11 which measures the elevation angle relative to the reflector and which will be described in closer detail in the following.

The device also comprises an angle transducer 12 consisting of a coded disc which indicates the momentary angular position of the rotating transmitter/sensor unit known as the azimuth angle.

The measurement equipment likewise comprises a first computer 13, called image computer, serving to process input information rapidly, and a second, larger navigation computer 14 containing complete information on the spatial coordinates x, y and z relative to all set-out reflectors 9. This computer makes all the calculations regarding the coordinates as well as those relative to the course, pitching and roll angles to correct the movements and/or the speed of a vehicle equipped with the device. An interface 15 is connected to the navigation computer 14 to serve as an identification unit between the angle transducer 12 and this computer, and also a control and display unit 16, the latter showing the position of the vehicle and supplying the control and guidance information obtained from the computer 14. Interface 15 and control and display unit 16 are equipment conventional to those skilled in the art. Likewise, computers 13 and 14 and their operation are conventional to those skilled in the art.

The signal transmission in either direction is effected by means of a bidirectional infrared (IR) link between two units 17 and 18. The IR link effects the transmission of information on the emitted pulsed beam of light and reflected light between the transmitter/sensor unit and the computers 13 and 14. Such IR links and their general method of operation are conventional to those skilled in the art.

Figure 4:
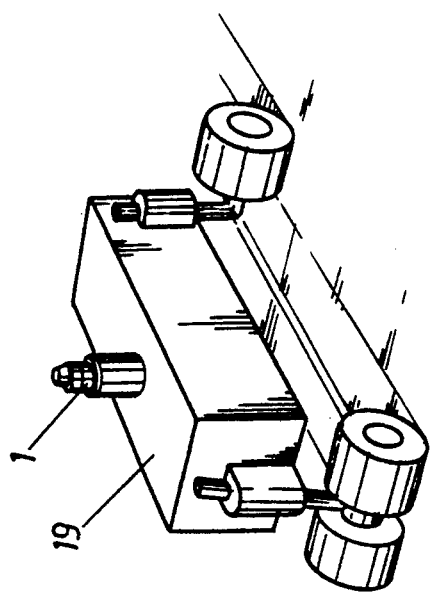
FIG. 4 is a perspective view of one example of a vehicle equipped with the device in accordance with the invention.

FIG. 4 shows one example of a vehicle 19 of a special design which is equipped with the device in accordance with the invention. The vehicle is intended to be driven across a field while being remote controlled and it is equipped with implements such as a plough or a harrow.

Figure 5:
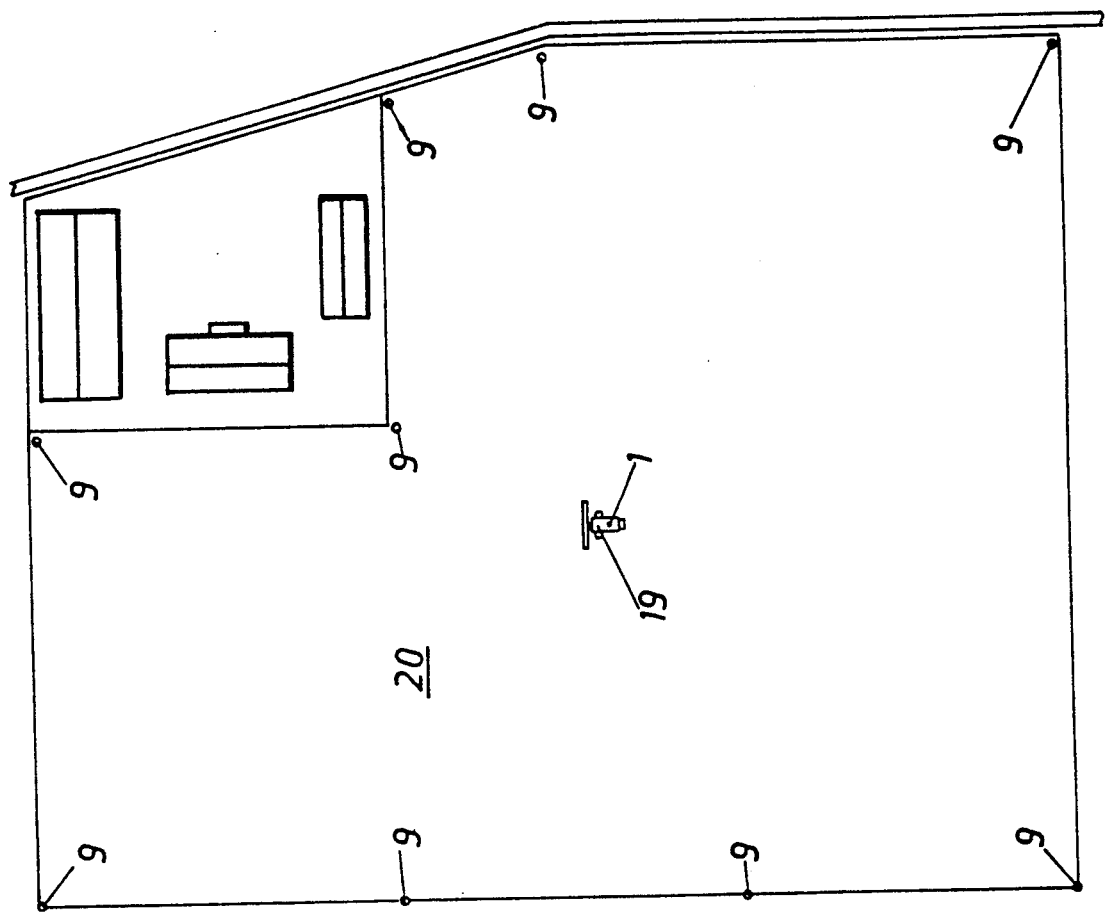
FIG. 5 is a plan view of a field adjoining a farm and vehicle equipped with the device, standing in the middle of the field.

FIG. 5 is a situation plan of a field 20 and a farm 21. The utility vehicle 19 is positioned in the middle of the field. Around the field 20 and along its borders a number of reflectors 9 are mounted on pillars 22 (see FIG. 3). Preferably, the reflectors are spherical, having a diameter of approximately one meter.

To set up the navigation systems a couple of reflectors 9 are initially put in positions in locations the coordinates of which are known and may be read from e.g. a survey map, such as some of the corners of the field 20. The coordinates are stored in the memory of the navigation computer 14. An arbitrary number of reflectors 9 are then set out as illustrated in FIG. 5. The vehicle 19 is then driven into the field 20 and is allowed to stand immobile briefly while the system is started up.

During the rotation of the transmitter/sensor unit the row of laser diodes 6 emits a pulsed beam of light 8 in the shape of a rotating vertical fan. The beam of light is reflected by the reflectors 9 and is received by the co-rotating camera 10 and transmitted further to the linear photo array 11. The latter consists of a chain of photo diodes 23 arranged along a vertical line and equipped with memory circuits 24, 25 on either side. When the light pulses reach the individual photo diodes 23 in the chain of diodes, charges are transferred to the memory circuits 24, 25. The memory circuits then emit electrical pulse signals to the image computer 13. This input information is rapidly processed in the image computer to determine the elevation angle, the pulse amplitude being sensed for comparison with a threshold value which is stored in the computer to ensure that any erroneous reflecting light pulses emitted by other objects than the reflectors 9 are eliminated.

Via the IR units 17, 18 the read-out message from the image computer 13 is transmitted to the larger navigation computer 14, the latter processing the received values resulting from the elevation angle and lateral angle measurements. In this manner the computer 14 stores the positional data on all the reflectors 9 and the position of the vehicle 19 relative to the reflectors. When the vehicle 19 is then started the transmitter/sensor unit measures continuously every change in the coordinates laterally and vertically and the vehicle is continuously supplied with correction orders based on the calculations made by the computer 14.

The rotational speed of the transmitter/sensor unit is comparatively high, approximately 10 revolutions per second. This provides updated information on the bearing and the elevation angle at frequent intervals. When the vehicle movements are normal the updating speed is so high that the position of the vehicle at any given moment is most accurately determined on the basis of a number of retrospective measurements which are used to calculate the instant position and attitude.

This possibility is made use of by the device which also comprises a Kalman filter to calculate instant and predicted positions and attitudes based not only on the latest measurements but also on a number of past measurements.

This predicting filter also makes it possible to increase the navigation reliability considerably for the reason that the available laser energy and the computer capacity may be concentrated to a smaller survey or scanning area for each new reflector passage. As a result, false signals such as from highly reflecting points in nature or from sources of very high intensity light are largely eliminated.

The vehicle 19 illustrated in the drawings is intended to be an unmanned vehicle, in which case a terminal which is connected to the navigation device is part of a remote control unit with the aid of which the vehicle operator may receive and transmit the information for control and guidance. The terminal could also be positioned in the driver's cabin of a vehicle such as a tractor, in which the driver from a monitor receives the information that is necessary to make the required corrective vehicle movements.

The device in accordance with the invention provides an excellent and comparatively uncomplicated navigation system with intended use within a relatively limited area. The reflectors 9 are simple and may be installed rapidly by the individual user. Despite its relative simplicity the navigation system allows the position to be determined with an accuracy of about 0.1m and it is free of negative effects, such as cross-interference between a number of vehicles or other neighbouring systems. The device is very useful in terrains of various nature, e.g. for the purpose of soil cultivation on agricultural fields or for the purpose of extracting peat from bogs and in forestry operations.

What I claim is:

1. A laser-optical method for navigating a vehicle comprising:
    a) providing a transmitter/sensor unit mounted on said vehicle for transmission of a beam of light and reception of reflected light, and a plurality of spaced-apart reflectors positioned a distance away from said transmitter/sensor unit for reflecting said beam of light;
    b) transmitting said beam of light away from said transmitter/sensor unit toward one of said reflectors;
    c) reflecting said beam of light off said one of said reflectors back toward said transmitter/sensor unit;
    d) receiving said reflected light with said transmitter/sensor unit;
    e) measuring an elevation angle of said vehicle from said reflected light;
    f) measuring an azimuth angle of said vehicle from said reflected light;
    g) repeating steps c)-g) for each of said plurality of reflectors;
    h) compiling said measured elevation angles and azimuth angles; and
    i) computing navigational data elements for said vehicle from said compiled elevation and azimuth angles, said elements comprising a position in three-dimensional coordinates, a heading, a pitch angle, and a roll angle, and wherein said elements may be used to navigate said vehicle.

2. The method of claim 1 wherein said beam of light is pulsed.

3. The method of claim 1 wherein said beam of light is in a shape of a vertical fan.

4. The method of claim 1 further comprising rotating said transmitter/sensor unit relative to said vehicle.

5. The method of claim 1 further comprising initially determining reference positions of said plurality of reflectors.

6. The method of claim 1 further comprising controlling the heading of said vehicle using control directives generated in response to said navigational data elements.

7. The method of claim 6 wherein said navigational data elements are computed remotely from said vehicle.

8. The method of claim 7 wherein the control directives are generated remotely from said vehicle and thereafter communicated to said vehicle.

9. A device for navigating a vehicle by a laser-optical method comprising:

a transmitter/sensor means mounted on said vehicle for transmitting a beam of light away from said vehicle and for receiving reflected light;
    a plurality of reflector means disposed a distance away from said transmitter/sensor means for reflecting said beam of light back to said transmitter/sensor means;
    an elevation angle measuring means for measuring elevation angles of said vehicles from said reflected light;
    an azimuth angle measuring means for measuring azimuth angles of said vehicle from said reflected light; and
    a computing means for compiling said elevation and azimuth angles received from said elevation and azimuth angle measuring means and computing navigational data elements for said vehicle from said compiled elevation and azimuth angles, said elements comprising a position in three-dimensional coordinates, a heading, a pitch angle and a roll angle, and wherein said elements may be used to navigate said vehicle.

10. The apparatus of claim 9 further comprising means for displaying said navigational data elements.

11. The apparatus of claim 9 wherein said means for transmitting said beam of light comprises a plurality of laser diodes, each laser diode having a beam focusing lens associated therewith, and a collimation lens located in front of said beam focusing lenses and being common to all said laser diodes and beam focusing lenses.

12. The apparatus of claim 9 wherein said elevation angle measuring means comprises a camera lens positioned to receive incoming reflected light, and a photo diode array located behind said camera lens in a focal plane of said camera lens.

13. The apparatus of claim 9 wherein said beam of light is pulsed.

14. The apparatus of claim 9 wherein said beam of light is in a shape of a vertical fan.

15. The apparatus of claim 9 wherein said transmitter/sensor means rotates relative to said vehicle.

16. The apparatus of claim 9 further comprising means for controlling the heading of said vehicle using control directives generated by said computing means in response to said navigational data elements.

17. The apparatus of claim 9 wherein said computing means is remote from said vehicle.

18. The apparatus of claim 17 further comprising a communication means for communicating between said remote computing means and said vehicle.

19. The apparatus of claim 9 wherein said computing means comprises a first computer compiling said elevation angles received from said elevation angle measuring means and a second computer for computing said navigational data elements for said vehicle from said compiled elevation angles and said azimuth angles.

20. The apparatus of claim 19 wherein said second computer is remote from said vehicle.

* * * * *